United States Patent [19]

Klanderman et al.

[11] 3,872,140
[45] Mar. 18, 1975

[54] LIQUID CRYSTALLINE COMPOSITIONS AND METHOD

[75] Inventors: Bruce H. Klanderman; Thomas R. Criswell, both of Rochester, N.Y.

[73] Assignee: Eastman Kodak Company, Rochester, N.Y.

[22] Filed: Feb. 12, 1973

[21] Appl. No.: 331,438

Related U.S. Application Data

[63] Continuation-in-part of Ser. No. 268,265, July 3, 1972, abandoned.

[52] U.S. Cl. ......... 252/408, 23/230 LC, 260/566 F, 350/160 LC
[51] Int. Cl. .............................................. C09k 1/02
[58] Field of Search ................ 260/566 F; 252/408; 350/160 LC; 23/230 LC

[56] References Cited
UNITED STATES PATENTS
2,544,659   3/1951   Dreyer .................................. 88/65
3,675,987   7/1972   Rafuse ............................. 350/160

OTHER PUBLICATIONS

Gray, Molecular Structure and the Properties of Liquid Crystals, 1962, pp. 125–136.
Chemical & Eng. News, Nov. 1, 1971, pp.20–23 Liquid Crystals Draw in Tense Interest, Usol'Tseva et al., Chemical Characteristics, Structure and Properties of Liquid Crystal, Russian Chemical Reviews, Vol. 32, No. 9, 9/63 pp. 495–507.

Primary Examiner—Leland A. Sebastian
Attorney, Agent, or Firm—H. M. Chapin

[57] ABSTRACT

A method is described for forming mixtures of Schiff bases wherein at least two different Schiff bases are mixed together and heated in the presence of a catalyst to effect an interconversion of substituents thereon. This results in a multicomponent mixture of Schiff bases having all combinations of the terminal substituents of the starting materials. This method is useful in forming nematic liquid crystalline compositions having a broad mesomorphic temperature range.

9 Claims, No Drawings

LIQUID CRYSTALLINE COMPOSITIONS AND METHOD

This is a continuation-in-part of U.S. Ser. No. 268,265, filed July 3, 1972, now abandoned.

FIELD OF THE INVENTION

This invention relates to a novel process for the formation of mixtures of Schiff bases and in particular to the formation of useful nematic liquid crystal mixtures.

DESCRIPTION OF PRIOR ART

British Pat. No. 1,170,486, dated November, 1969, discloses that several nematic liquid crystalline materials, This invention relates to a novel process for the formation of mixtures typically Schiff bases, can be heated together in order to produce a homogeneous mixture characterized in that (1) the crystal to mesophase transition temperature is lower than that for the individual components of the mixture; and (2) the mesophase is stable over a relatively wide temperature range.

In some cases, the mesophase is broader than might be expected from the eutectic behavior of the starting components, such that the broad stable mesophase is believed due to chemical transformations caused by the presence of small amounts of impurities, e.g., aromatic organic acids, employed in the preparation of the individual Schiff bases used. The amount of impurity present in the Schiff base after purification will change from run to run due to the variation generally experienced in repeating organic preparative procedures. Thus, on occasion, insufficient impurity will have carried through to yield the desired crystal to mesomorphic transition temperature of the mixture of such impure compounds. It is seen that the uncertain reproducibility of this procedure does not easily lend itself to the production of large quantities of nematic liquid crystalline mixtures having the required transition temperatures and nematic ranges.

Accordingly, there is a need for a facile, reproducible process for preparing nematic liquid crystalline mixtures from Schiff bases.

SUMMARY OF INVENTION

We have found a new process, transiminization, in which Schiff bases (imines) can be interconverted in the presence of a catalytic agent to give a mixture of all possible Schiff bases represented by the carbonyl and amino components of the original Schiff bases. The mixtures of interest obtained by this process are nematic liquid crystalline compositions useful in various display devices such as electro-optical devices of the type well known in the art.

DESCRIPTION OF PREFERRED EMBODIMENTS

The interconversion process of transiminization process of this invention comprises the steps of first mixing together at least two Schiff bases formed from at least two different carbonyl compounds (e.g., aldehydes and ketones) and two different amines. The term Schiff base as used herein has general reference to any compound containing an azomethine linkage —CH=N— (also known as an imine linkage) having a carbon atom directly attached at either end. The azomethine linkage can have attached thereto both aliphatic and aromatic substituents, with aromatic substituents being preferred because of the liquid crystalline propensities of the resultant compounds. The term is also meant to include similar compounds wherein the hydrogen of the azomethine linkage is replaced with a carbon atom (e.g.,

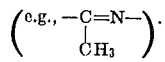

Next, in accordance with this process, the mixture of Schiff bases is heated in the presence of a catalyst to effect interconversion. Frequently, the mixture is heated until it becomes isotropic and clear; the temperature at which a given mixture becomes isotropic will vary depending upon the particular mixture used. For many mixtures, it is not necessary to heat to the point of becoming isotropic; however, that is a convenient visual indicator of having heated to a temperature often sufficient to sustain the present transiminization process. A useful temperature range for heating the mixture of Schiff bases is from about 50° to about 120° C. Higher temperatures can be used in order to shorten the reaction time; however, the temperature should not exceed the temperature of decomposition of the ingredients or the reaction products. Generally, the reaction mixture is heated to a suitable elevated temperature for a period of time from about 5 minutes to about 100 hours, depending on the reactivity of the Schiff bases. Preferably, the reaction mixture is heated from about 1 hour to about 80 hours.

The present process is conducted in the presence of a catalyst. Suitable materials for this include alkylamine salts (e.g., triethylamine hydrochloride), p-toluenesulfonic acid, ammonium chloride, sodium acetate, ammonium acetate, ion exchange resins, and the like. In addition, trace amounts of water may facilitate the reaction. Generally, it is desirable that any water remaining after the interconversion be removed.

Ion-exchange compounds, particularly ion exchange resins, are useful as catalysts in the process of the invention. Ion exchange resins consist of a polymeric matrix having attached cationic on anionic groups. These resins may be considered as high molecular weight polymeric electrolytes in which the ions behave as they do in crystalline ionic solids. Transiminization catalysis by such resins is highly effective and reproducible. At the conclusion of the transiminization reaction, the ion exchange resin is conveniently removed from the reaction mixture by filtration. Removal of the resin catalyst is more complete and is less time consuming than the removal of other types of catalysts. The purity of the liquid crystalline mixture is improved as a result of the decreased handling time and contamination from moisture and oxygen is greatly curtailed. Also, contamination by unwanted aldehydes and anilines and their oxidation products, generated by prolonged exposure to ambient conditions during workup of the reaction mixture is reduced. The resistivity of the liquid crystalline mixtures after removal of the ion exchange resin is satisfactory, as opposed to the resistivity of such mixtures when transiminized by other methods. Additionally, complete removal of the ion exchange resin eliminates undesirable contributions of unremoved catalyst to the electro-optical properties of the mixture.

The type of ion-exchange resin employed in the process of the invention is not critical. Either basic or acidic resins may be used. For example, commercially available polymeric resins comprising basic or acidic groups are suitable catalysts. The polymeric matrix in such resins is typically a polystyrene, a copolymer of styrene and a p-divinylbenzene, a condensation product of phenol and formaldehyde, a copolymer of acrylic or methacrylic acid or the polymer from the reaction of epichlorohydrin with an amine. Resins of these types are further described in Volume 7 of the *Encyclopedia of Polymer Science and Technology*, Interscience Publications Division of John Wiley and Son, New York. Ion-exchange resins comprising polystyrene or copolymers of styrene and a p-divinylbenzene are especially preferred. Exemplary ion-exchange resins are the Amberlyst and Amberlite type resins made by the Rohm and Haas Company, Philadelphia, Pennsylvania. Amberlyst 15, Amberlite IRA-400 and Amberlite IR-120 have been found especially useful. The resin selected, the concentration at which it is employed and the time required for the interconversion will depend, of course, on the reactivity of the mixture of Schiff bases that are being treated by the process of the invention. These conditions are conveniently determined by procedures well known in the art and commonly used in optimizing organic reactions induced by the action of a catalytic agent.

It is desirable that the ion-exchange resin employed in the transiminization reaction be substantially free of moisture and extraneous color. A convenient procedure entails repeatedly washing the resin before use at ambient temperature with one or more suitable organic solvents until color is no longer imparted to the wash liquors. The washed resin is dried in vacuo at ambient temperature. A particularly useful method comprises washing the resin with dry methanol and dry benzene in succession and drying the washed material.

The Schiff bases particularly useful in this interconversion process include those having the formula:

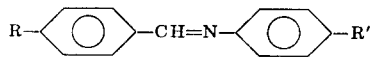

wherein R and R' can be an alkyl radical having from one to about 20 and preferably one to about 12 carbon atoms, including branched and straight chained alkyl as well as substituted alkyl radicals having such substituents as halogen, cyano, nitro, and alkoxy; an alkoxy radical having from one to about 20 and preferably one to about 12 carbon atoms in the alkyl moiety including substituted alkoxy having such substituents as described above for the alkyl radicals; an acyloxy radical containing from two to about 20 and preferably two to about 12 carbon atoms; an alkoxycarbonyloxy radical having from one to about 20 and preferably one to about 12 carbon atoms in the alkoxy moiety; a carbonylalkoxy radical having one to about 20 carbon atoms in the alkoxy moiety and preferably having one to about 12 carbon atoms; a carbonylalkyl radical having one to about 20 and preferably one to about 12 carbon atoms in the alkyl moiety; an aryl radical such as phenyl, tolyl, naphthyl, etc; a halogen atom; a cyano radical, etc. Of course, either or both of the phenylene radicals in the above formula can also be naphthylene. Other Schiff bases which can be interconverted by the present process are aliphatic Schiff bases having the formula:

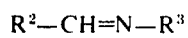

wherein $R^2$ and $R^3$ each can be an alkyl radical having from one to about 20 carbon atoms including branched or straight chained alkyl and including substituted alkyl radicals as discussed above and one of $R^2$ and $R^3$ can be an aryl radical as discussed above. In addition, useful Schiff bases can be derived from ketones and have the formula:

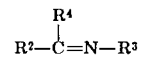

or

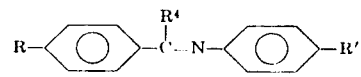

wherein $R^4$ is an alkyl or aryl radical as described above and $R^2$, $R^3$, R and R' are as described previously. Schiff bases formulated from diamines and dicarbonyl compounds can be used such as those having the formula:

wherein R and R' are as described previously.

The reaction between two Schiff bases formed from two different carbonyl compounds and two different amines results in a mixture of four Schiff bases:

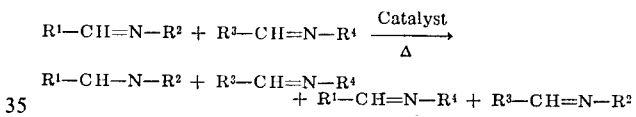

Thus, it is readily apparent that if RCH= is thought of as a carbonyl moiety and =N—R is thought of as an amine moiety, the present interconversion process results in a mixture of Schiff bases having all possible combinations of a carbonyl moiety with an amine moiety.

A distinguishing feature of the process of the invention is that substantially the same crystal to mesomorphic transition temperature is obtained in successive runs for a given mixture of Schiff bases. The ease of reproducibility is due in large measure to the purity of the Schiff bases employed. It is highly desirable that the starting compounds be prepared from the component carbonyl compounds and amines in the absence of a catalyst. If the compounds are prepared using a catalyst, then essentially all traces of catalyst should be removed prior to use. However, as the catalytic agents employed in preparing the starting Schiff bases are extremely difficult to remove and small amounts remaining in the purified compounds will adversely affect the properties of the interconverted material obtained in the process of the invention, it is desirable to prepare the starting compounds without a catalyst.

The Schiff bases, derived from aromatic aldehydes and amines, used as reactants in the present process are liquid crystalline materials. In addition, the mixtures formed by the process of this invention using those Schiff bases are also liquid crystalline in nature. The compositions formed by this process are nematic liquid crystalline compositions which typically have a broad mesomorphic temperature range which is broader than the range of the mixture of original reactants. A particularly useful advantage of many of the multicomponent mixtures prepared as described herein is that they are nematic at room temperature. The mixtures described can be used in a variety of ways such as in an electro-optical display device of the type generally described in VanMeter et al U.S. application Ser. No. 247,564, filed Apr. 26, 1972, now abandoned and entitled LIQUID CRYSTALLINE COMPOSITIONS I or in Goldmacher et al. U.S. Pat. No. 3,540,796, issued Nov. 17, 1970.

In addition to the original Schiff bases used in this process, other liquid crystalline materials can be added to the reactants prior to initiating the interconversion process. Such other addenda while being nematic liquid crystals are not Schiff bases and therefore, are not actually involved in the interconversion process. Exemplary additives of this type would include the p,p'-substituted phenyl benzoates as described, for example, in VanMeter et al U.S. Ser. No. 247,564 (supra).

The following examples are included for a further understanding of the invention.

EXAMPLE 1

A mixture of 2 molar parts of p-pentoxycarbonyloxy-N-(p-valeryloxybenzylidene)aniline $$C_4H_9CO-\phantom{x}-CH=N-\phantom{x}-OCO-C_5H_{11}$$

and 1 molar part of N-(p-acetoxybenzylidene)-p-methoxycarbonyloxyaniline $$CH_3CO-\phantom{x}-CH=N-\phantom{x}-OCO-CH_3$$

both containing traces of triethylamine hydrochloride, is heated (ca. 100°C) until the material becomes isotropic and is allowed to cool. The new mixture obtained has a nematic range (m.p.) from 14°–98° C. Vapor-phase chromatographic analysis and the use of known single compounds indicates a four-component mixture as follows:

5 parts
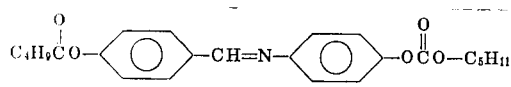
V 2 parts
$$C_4H_9CO-\phantom{x}-CH=N-\phantom{x}-OCO-CH_3$$
VA 2 parts
$$CH_3CO-\phantom{x}-CH=N-\phantom{x}-OCO-C_5H_{11}$$
AV 1 part
$$CH_3CO-\phantom{x}-CH=N-\phantom{x}-OCOCH_3$$
A

EXAMPLE 2

A mixture of 2 molar parts of Compound V and 1 molar part of Compound A, both free of triethylamine hydrochloride, is combined with 0.2% by weight of purified triethylamine hydrochloride, heated to the isotropic state (ca. 100° C) twice and maintained at 60° C for 10 minutes. The new material obtained has a nematic range (m.p.) from 19°–98° C. Vapor-phase chromatographic analysis indicates a four-component mixture similar to that described in Example 1.

EXAMPLE 3

An experiment similar to that described in Example 2, but without the addition of triethylamine hydrochloride, gives a material representing only the original components V and A in a 2:1 molar ratio. This material has a nematic range of 42°–98° C.

EXAMPLE 4

Thermal equilibrium study

Seven mixtures comprising a 2:1 molar ratio of Compound V to Compound A and 0.25% by weight of purified triethylamine hydrochloride are heated at 80° C for different periods of time as indicated. Each sample is treated with benzene and the insoluble triethylamine hydrochloride is removed by filtration through a fine sintered-glass funnel, before the benzene is removed under vacuum. Each sample is analyzed by vapor-phase chromatography. After 4 hours at 80° C, the equilibrium ratio of approximately 5:2:2:1 of V:VA:AV:A is obtained.

| Sample | Heating Time, Hour | Composition | | | |
|---|---|---|---|---|---|
| | | % V | % VA | % AV | % A |
| 1 | 0.25 | 75 | 3 | 3 | 20 |
| 2 | 0.50 | 72 | 4 | 4 | 21 |
| 3 | 1 | 70 | 5 | 5 | 20 |
| 4 | 2 | 61 | 13 | 12 | 14 |
| 5 | 4 | 53 | 20 | 20 | 7 |
| 6 | 7 | 52 | 20 | 19 | 8 |
| 7 | 20 | 52 | 20 | 19 | 9 |

EXAMPLE 5

The materials indicated below are purified by distillation and/or recrystallization and combined in the quantities indicated.

| No. | Formula | Amount, g. |
|-----|---------|------------|
| 1 | $C_2H_5O$—⬡—$OC$(=O)—⬡—$OC$(=O)$OC_4H_9$ | 0.9634 |
| 2 | $C_4H_9O$—⬡—CH=N—⬡—$C_3H_7$ | 0.9634 |
| 3 | $C_2H_5O$—⬡—CH=N—⬡—$C_4H_9$ | 0.9634 |
| 4 | $CH_3O$—⬡—CH=N—⬡—$OC$(=O)$C_3H_7$ | 4.2967 |
| 5 | $C_4H_9O$—⬡—CH=N—⬡—$CO$(=O)$C_2H_5$ | 2.8131 |

A temperature-time study utilizing vapor-phase chromatographic analysis indicates that equilibrium is obtained after 1 hour at 100° C (under nitrogen atmosphere). The nematic range of the equilibrium mixture is 15°–102° C. Analysis of the resultant composition shows the following components to be present.

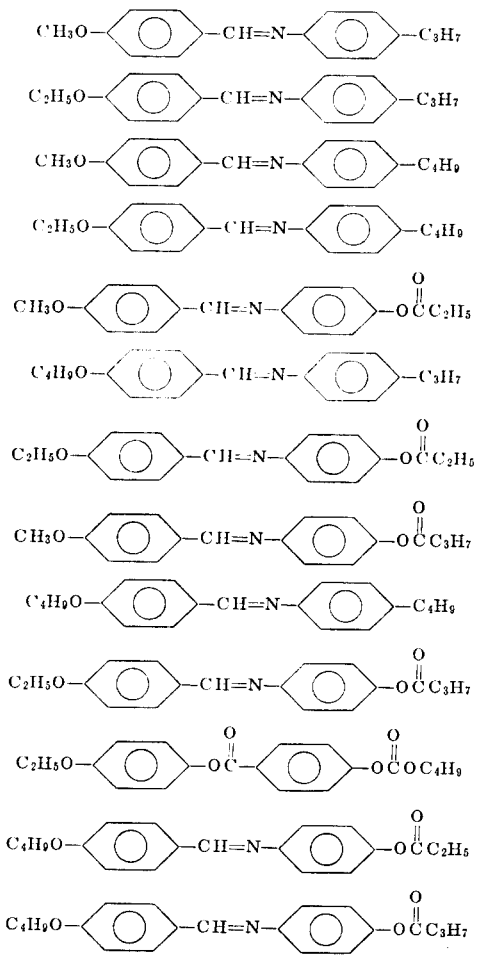

EXAMPLE 6 — CATALYSIS BY ION-EXCHANGE RESIN

Amberlyst 15 is repeatedly washed with dry methanol and dry benzene in succession at room temperature until no color is imparted to the wash liquid. The washed resin is dried under vacuum at room temperature. The following compounds are purified by distillation and/or recrystallization: (1) N-(p-methoxybenzylidene)-p'-butyryloxyaniline, (2) N-(p-butoxybenzylidene)-p'-propionyloxyaniline, and (3) N-(p-valeryloxybenzylidene)-p'-pentyloxycarbonyloxyaniline. In a clean, dry, nitrogen-flushed brown bottle fitted with a suitable closure are placed 150 mg. (0.5% by weight) of Amberlyst 15 and the three compounds named above in the following quantities: Compound 1 — 13.398 g; Compound 2 — 7.338 g; and Compound 3 — 9.291 g. The bottle is placed in an oil bath held at 80° C and magnetically stirred for 12 hours. After cooling to room temperature, the mixture is filtered with suction through an inert filter, 0.5 micron pore size, by means of a stainless steel or Pyrex filter holder. The filtrate is purged with dry nitrogen. Vapor-phase chromatographic analysis indicates that transiminization has occurred. The resistivity of the filtered and purged mixture is $> 3.0 \times 10^{11}$ ohm-cm; the nematic range is 4°–103° C.

EXAMPLE 7 — CATALYSIS BY ION-EXCHANGE RESIN

Example 6 is repeated with only 60 mg. (0.2% by weight) of Amberlyst 15 resin. The mixture is heated at 80° C for 65 hours. The nematic range of the final mixture is 4°–104° C.

EXAMPLE 8 — CATALYSIS BY ION-EXCHANGE RESIN

Three separate mixtures—A, B and C—of compounds 1, 2 and 3 are prepared in the same proportions and amounts as described in Example 6. Mixture A is catalyzed with 10% by weight of a representative basic ion-exchange resin — Amberlite IRA-400 (a polystyrene quaternary ammonium chloride made by the Rohm and Haas Co.). Mixture B is catalyzed with 10% by weight of a representative acid ion-exchange resin — Amberlite IR-120 (a polystyrenesulfonic acid made by the Rohm and Haas Co.). Both resins are washed and dried in the manner of Example 6. Mixture C is not treated with a resin catalyst and serves as a control. Each mixture is heated and stirred according to the procedure of Example 6 at 80° C for 65 hours. After cooling to room temperature, each mixture is treated as in Example 6. Vapor-phase chromatographic analysis indicates the occurrence of transiminization in Mixtures A and B and none in Mixture C.

| | |
|---|---|
| Mixture A | −1 to 85°C |
| Mixture B | −1 to 91°C |
| Mixture C | 22ˢ-32ˢ-105°C |

ˢ denotes smectic range
ᶰ denotes nematic range

Of course, it is to be understood that if compounds are used which have a complete redundancy of end groups (i.e., substituents R and R'), the present process will result in no significant change in the properties of the treated mixture. In order for the present process to result in any significant change in the properties of the treated mixture there must be at least two different Schiff bases. Especially good results are obtained with more than two different Schiff bases in the starting mixture.

The invention has been described in detail with particular reference to preferred embodiments thereof, but, it will be within that variations and modifications can be effected with the spirit and scope of the invention.

We claim:

1. A process for interconversion of Schiff bases comprising the steps of mixing together at least two different Schiff bases of the formula:

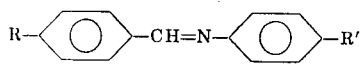

wherein R and R' each represent a member selected from the group consisting of an alkyl radical, an alkoxy radical, an acyloxy radical, an alkoxy carbonyloxy radical and a cyano radical and heating the resultant mixture in the presence of a catalyst capable of effecting interconversion of the Schiff bases to form a mixture of different Schiff bases having all possible combinations of the selected substituents R and R'.

2. A process for interconversion of Schiff bases comprising the steps of mixing together at least two different Schiff bases of the formula:

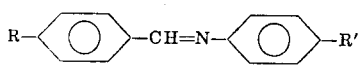

wherein R and R' each represent a member selected from the group consisting of an alkyl radical, an alkoxy radical, an acyloxy radical, an alkoxycarbonyloxy radical and a cyano radical and heating the resultant mixture in the presence of a catalyst capable of effecting interconversion of the Schiff bases to form a mixture of different Schiff bases having all possible combinations of the selected substituents R and R', wherein said catalyst is selected from the group consisting of alkylamine salts, p-toluenesulfonic acid, ammonium chloride, ammonium acetate and sodium acetate.

3. A process for interconversion of Schiff bases comprising the steps of mixing together at least two different Schiff bases of the formula:

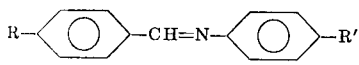

wherein R and R' each represent a member selected from the group consisting of an alkyl radical, an alkoxy radical, an acyloxy radical, an alkoxycarbonyloxy radicaland a cyano radical and heating the resultant mixture in the presence of a catalyst capable of effecting interconversion of the Schiff bases to form a mixture of different Schiff bases having all possible combinations of the selected substituents R and R', wherein said catalyst is a basic or acidic ion-exchange resin.

4. The process as described in claim 1 wherein R and R' are each selected from the group consisting of an acyloxy radical having two to about 12 carbon atoms and an alkoxy carbonyloxy radical having one to about 12 carbon atoms in the alkoxy moiety.

5. The proces as described in claim 1 wherein R is an alkoxy radical having one to about 12 carbon atoms and R' is selected from the group consisting of an alkyl radical having one to about 12 carbon atoms and an acyloxy radical having two to about 12 carbon atoms.

6. A process of forming a multicomponent nematic liquid crystalline composition comprising the steps of mixing together at least two different nematic liquid crystalline Schiff base reactants of the formula:

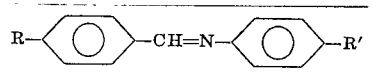

wherein R and R' each represent a member selected from the group consisting of an alkyl radical, an alkoxy radical, an acyloxy radical, an alkoxycarbonyl radical and a cyano radical and heating the resultant mixture in the presence of a catalytic amount of a basic or acidic ion-exchange resin to form a mixture of different Schiff bases having all possible combinations of the selected substituents R and R' contained on the original Schiff base reactants, said multicomponent liquid crystalline composition having a broader mesomorphic temperature range than the mixture of original Schiff base reactants.

7. The process as described in claim 6 wherein said resin is a polystyrene ion-exchange resin.

8. The process as described in claim 6 wherein the ion-exchange resin comprises a copolymer of styrene and p-divinylbenzene.

9. A process for interconversion of Schiff bases comprising the steps of mixing (a) at least one Schiff base of the formula:

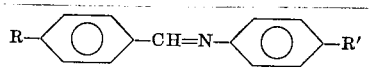

wherein R represents an alkoxy radical having one to about 12 carbon atoms and R' represents an acyloxy radical having two to about 12 carbon atoms with (b) at least one different Schiff base of the above formula wherein R represents an acyloxy radical having two to about 12 carbon atoms and R' represents an alkoxy carbonyloxy radical having one to about 12 carbon atoms in the alkoxy moiety and heating in the presence of a catalytic amount of a basic or acidic ion-exchange resin to form a mixture of different Schiff bases having all possible combinations of the selected substituents R and R' contained on the original Schiff base reactants.

* * * * *

UNITED STATES PATENT OFFICE
CERTIFICATE OF CORRECTION

PATENT NO. : 3,872,140
DATED : March 18, 1975
INVENTOR(S) : Bruce H. Klanderman and Thomas R. Criswell It is certified that error appears in the above-identified patent and that said Letters Patent are hereby corrected as shown below:

Col. 1, lines 15 and 16, delete "This invention relates to a novel process for the formation of mixtures".

Col. 3, line 42, insert --each-- after "R'".

Col. 7, line 15, Formula No. 5 should read as follows:

Col. 8, line 46, add the following sentence --The nematic ranges are as follows:--.

Signed and Sealed this twenty-sixth Day of August 1975

[SEAL]

Attest:

RUTH C. MASON
Attesting Officer

C. MARSHALL DANN
Commissioner of Patents and Trademarks